United States Patent
Gohr et al.

(10) Patent No.: US 11,135,820 B2
(45) Date of Patent: Oct. 5, 2021

(54) EVOH-COATED, BIAXIALLY ORIENTED, HIGH-DENSITY, POLYETHYLENE FILMS WITH METAL-OXIDE DEPOSITION

(71) Applicant: Jindal Films Americas LLC, LaGrange, GA (US)

(72) Inventors: Eric T. Gohr, Sharpsburg, GA (US); Robert M. Sheppard, Peachtree City, GA (US); Ting Chen, Newnan, GA (US)

(73) Assignee: Jindal Films Americas LLC, LaGrange, GA (US)

( * ) Notice: Subject to any disclaimer, the term of this patent is extended or adjusted under 35 U.S.C. 154(b) by 0 days.

(21) Appl. No.: 17/244,041

(22) Filed: Apr. 29, 2021

(65) Prior Publication Data

US 2021/0245480 A1    Aug. 12, 2021

Related U.S. Application Data

(63) Continuation of application No. PCT/US2020/038380, filed on Jun. 18, 2020.

(60) Provisional application No. 62/908,628, filed on Oct. 1, 2019, provisional application No. 62/865,570, filed on Jun. 24, 2019, provisional application No. 62/865,558, filed on Jun. 24, 2019, provisional application No. 62/863,938, filed on Jun. 20, 2019.

(51) Int. Cl.
| | |
|---|---|
| *B32B 27/32* | (2006.01) |
| *B29C 48/08* | (2019.01) |
| *B29C 48/21* | (2019.01) |
| *B29C 48/00* | (2019.01) |
| *B29C 55/14* | (2006.01) |
| *B32B 27/08* | (2006.01) |
| *B32B 27/16* | (2006.01) |
| *B32B 27/18* | (2006.01) |
| *B32B 7/12* | (2006.01) |
| *B32B 27/20* | (2006.01) |
| *B65D 65/40* | (2006.01) |
| *B29K 23/00* | (2006.01) |
| *B29K 105/00* | (2006.01) |

(52) U.S. Cl.
CPC .......... *B32B 27/32* (2013.01); *B29C 48/0018* (2019.02); *B29C 48/08* (2019.02); *B29C 48/21* (2019.02); *B29C 55/143* (2013.01); *B32B 7/12* (2013.01); *B32B 27/08* (2013.01); *B32B 27/16* (2013.01); *B32B 27/18* (2013.01); *B32B 27/20* (2013.01); *B32B 27/327* (2013.01); *B65D 65/40* (2013.01); *B29K 2023/065* (2013.01); *B29K 2023/0633* (2013.01); *B29K 2023/12* (2013.01); *B29K 2105/0008* (2013.01); *B32B 2250/03* (2013.01); *B32B 2250/05* (2013.01); *B32B 2250/24* (2013.01); *B32B 2250/242* (2013.01); *B32B 2255/10* (2013.01); *B32B 2255/20* (2013.01); *B32B 2255/205* (2013.01); *B32B 2255/26* (2013.01); *B32B 2270/00* (2013.01); *B32B 2307/30* (2013.01); *B32B 2307/516* (2013.01); *B32B 2307/518* (2013.01); *B32B 2307/72* (2013.01); *B32B 2307/7244* (2013.01); *B32B 2307/7246* (2013.01); *B32B 2307/732* (2013.01); *B32B 2439/40* (2013.01); *B32B 2439/46* (2013.01); *B32B 2439/70* (2013.01); *B32B 2553/00* (2013.01)

(58) Field of Classification Search
CPC ........ B32B 27/32; B32B 27/08; B32B 27/16; B32B 27/2718; B32B 7/12; B32B 27/20; B32B 27/327; B32B 2255/10; B32B 2255/205; B32B 2250/05; B32B 2250/242; B32B 2255/20; B32B 2255/26; B32B 2270/00; B32B 2307/518; B32B 2307/7244; B32B 2307/7246; B32B 2439/46; B32B 2439/70; B32B 2439/40; B32B 2250/03; B32B 2250/24; B32B 2307/30; B32B 2307/516; B32B 2307/72; B32B 2307/732; B32B 2553/00; B29C 48/08; B29C 48/21; B29C 48/0018; B29C 55/143; B65D 65/40; B29K 2023/0633; B29K 2023/065; B29K 2023/12; B29K 2105/0008

See application file for complete search history.

(56) References Cited

U.S. PATENT DOCUMENTS

| | | |
|---|---|---|
| 6,013,353 A | 1/2000 | Touhsaent |
| 2002/0182390 A1 | 12/2002 | Migliorini et al. |

(Continued)

OTHER PUBLICATIONS

Young, Lee W., International Search Report and Written Opinion on PCTUS2038380, dated Sep. 24, 2020, USPTO as RO for WIPO, Alexandria, US.

*Primary Examiner* — Michael C Miggins
(74) *Attorney, Agent, or Firm* — Rao DeBoer Osterrieder, PLLC; Erik J. Osterrieder

(57) ABSTRACT

Disclosed are compositions and methods for multilayer films, which, in one embodiment may include a core layer comprising a polyethylene stabilizer optionally in a masterbatch solution and at least 50 wt. % of high-density polyethylene. Further, the multilayer film may include a first skin layer comprising at least 90 wt. % ethylene-propylene polymer and antiblock, and a second skin layer consisting of an ethylene-propylene copolymer or terpolymer. Further still, the multilayer film may include a primer layer on the second skin, an aqueous barrier layer of ethylene vinyl alcohol polymer, polyvinyl alcohol polymer, or combinations thereof on the primer layer. And, further still, multilayer film may include a metallization layer on the aqueous barrier layer, wherein the multilayer film may be oriented in at least one direction.

21 Claims, No Drawings

(56) References Cited

U.S. PATENT DOCUMENTS

| | | |
|---|---|---|
| 2003/0211350 A1 | 11/2003 | Migliorini et al. |
| 2013/0309426 A1 | 11/2013 | Thai et al. |
| 2018/0272672 A1 | 9/2018 | Ambroise |

EVOH-COATED, BIAXIALLY ORIENTED, HIGH-DENSITY, POLYETHYLENE FILMS WITH METAL-OXIDE DEPOSITION

REFERENCE TO RELATED APPLICATIONS

This is a continuation application, which claims priority to Patent Treaty Cooperation application number PCT/US20/38380 filed on Jun. 18, 2020 that claims priority to each of U.S. provisional patent application Ser. Nos. 62/908,628 filed on 1 Oct. 2019, 62/865,570 filed on 24 Jun. 2019, 62/865,558 filed on 24 Jun. 2019, and 62/863,938 filed on 20 Jun. 2019, wherein each of the foregoing is hereby incorporated by this reference in its entity and is owned by Applicant.

FIELD

This disclosure relates to compositions and methods of biaxially oriented ("BO") high-density polyethylene ("HDPE") multilayer films that have a coating comprising, consisting essentially of, or consisting of ethylene vinyl alcohol copolymer(s) ("EVOH") and/or polyvinyl alcohol copolymer(s) ("PVOH") having a metal-oxide deposited thereon. Hereinafter, EVOH is understood to include EVOH polymers only, EVOH and PVOH polymers, or PVOH polymers only.

BACKGROUND

Polyethylene films are broadly used in packaging. Un-oriented films generally have mediocre physical properties and need to be combined to other webs such as paper, PET, BOPP, and so forth in order to provide mechanical strength, or such as metallized PET, metallized BOPP, Nylon or aluminum foil in order to provide barrier protection.

What is needed, however, are metalized multilayer films that have enhanced barrier properties in packages at reduced thickness. The advantage for the customer is a reduced amount of packaging at same performances. Furthermore, what is needed are new multilayer films that withstand metallization and provide a high-barrier film along with a combination of tensile modulus and film cohesive strength as do the disclosed films herein.

SUMMARY

Disclosed are compositions and methods for multilayer films, which, in one embodiment may include a core layer comprising a polyethylene stabilizer optionally in a masterbatch solution and at least 50 wt. % of high-density polyethylene. Further, the multilayer film may include a first skin layer comprising at least 90 wt. % ethylene-propylene polymer and antiblock, and a second skin layer consisting of an ethylene-propylene copolymer or terpolymer. Further still, the multilayer film may include a primer layer on the second skin, an aqueous barrier layer of ethylene vinyl alcohol polymer, polyvinyl alcohol polymer, or combinations thereof on the primer layer. And, further still, multilayer film may include a metallization layer on the aqueous barrier layer, wherein the multilayer film may be oriented in at least one direction.

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are described now, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

Generally, disclosed are compositions, structures, and methods for multilayer films comprising, consisting essentially of, or consisting of polypropylene copolymers, terpolymers, or combinations thereof alongside optional addition of additives, such as an antiblock agent, which may be in a polypropylene-based masterbatch in one or both skins with a core comprising, consisting essentially of, or consisting of HDPE, LLDPE, e.g., mLLDPE, polyethylene stabilizer and optionally additives. Furthermore, such multilayer films may have one or more tie layers comprising, consisting essentially of, or consisting of HDPE, LLDPE, e.g., mLLDPE, olefin block copolymer(s), e.g., Lyondell-Basell Equistar Adflex X500F, polyethylene stabilizer and optionally additives. Viewing the foregoing description of multilayer films as "substrates," said substrates may be treated or not before application of an EVOH coating, optionally primed, onto a skin of the substrate. Deposited, such as by vacuum or plasma deposition, onto the EVOH coating is a metal or metal-oxide, such as Al or $AlO_x$.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film, wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 $g/cm^3$ to 0.920 $g/cm^3$ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

By "consist essentially of," what is meant, for example, is that a particular film layer does not have any more than 1 wt % or 2 wt % or 3 wt % or 4 wt % or 5 wt % of other polymers in the bulk material constituting the film layer's composition, but "consist essentially of" does not exclude the possibility that the particular film layer also has additives, such as anti-slip agents, anti-blocking agents, anti-oxidants, pigments, whitening agents, cavitation agents, etc. regardless of what polymers or other materials make up the additive(s).

As used herein, "about" means the number itself and/or within 5% of the stated number. For instance, with about 5%, this means 5 and/or any number or range within the range of 4.75 to 5.25, e.g., 4.75 to 4.96, 4.81 to 5.1, etc.

Core Layer

As is known to those skilled in the art, the core layer of a multilayered film is most commonly the thickest layer and provides the foundation of the multilayered structure. In some embodiments, the core layer comprises, consists essentially of, or consists of biaxially oriented high-density polyethylene ("HDPE"). In various embodiments, the core layer comprises at least 50 wt %, at least 60 wt %, at least 70 wt %, at least 80 wt %, at least 85 wt %, at least 90 wt %, at least 95 wt %, or more of HDPE. In alternative embodiments, said biaxially oriented core layer further comprises, consists essentially of, or consists of low-density polyethylene ("LDPE"), e.g., metallocene, Ziegler-Natta and/or otherwise catalyzed or mixtures thereof, as well as being linear ("LLDPE") or cross-linked. And in more alternative embodiments, said biaxially oriented core layer may yet further comprise, consist essentially of, or consist of one or more polyethylene stabilizers, such as Schulman 0353-STAB.

The core layer may also include one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 10 wt %, based on the total weight of the core layer.

Preferably, the total amount of additives in the core layer comprises up to about 20 wt % of the core layer, but some embodiments may comprise additives in the core layer in an amount up to about 30 wt % of the core layer.

Tie Layer(s)

Tie layer(s) of a multilayered film is typically used to connect two other layers of the multilayered film structure, e.g., a core layer and a skin layer, and is positioned intermediate these other layers. Each tie layer may have the same or a different composition as compared to any other tie layer.

The tie layer may comprise, consist essentially of, or consists of one or more olefin block copolymers or terpolymers of polypropylene in combination with one or more polyethylenes, e.g., a mixture of HDPE and LDPE, LLDPE, or both, as well as polyethylene stabilizers and optionally additives. For example, the HDPE may be HTA108 from ExxonMobil® or Nova 19A, the olefin block copolymer may be Equistar Adflex X500F from LyondellBasell, and the polyethylene stabilizer may be from Schulman 0353-STAB.

In some embodiments, tie layers, like the core and skin layers in the disclosure may further include one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

Skin Layer(s), Including Metallizable Skin Layers

In some embodiments, the skin layer comprises, consists essentially of, or consists of at least one polymer selected from the group comprising, consisting essentially of, and/or consisting of one or more copolymer or terpolymer of polypropylene, such as one or more ethylene-propylene copolymers, ethylene-propylene-butylene terpolymers, or combinations thereof.

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.20 μm through 3.5 μm, or from 0.30 μm through 2 μm, or in many embodiments, from 0.50 μm through 1.0 μm. In thin film embodiments, the skin layer thickness may range from about 0.20 μm through 1.5 μm, or 0.50 μm through 1.0 μm.

Additives

Additives present in any of the film's layers may include, but are not limited to opacifying agents, pigments, colorants, cavitating agents, slip agents, antioxidants, anti-fog agents, anti-static agents, anti-block agents, fillers, moisture barrier additives, gas barrier additives, gas scavengers, and combinations thereof. Such additives may be used in effective amounts, which vary depending upon the property required, and may be added to one or more of the film's layer(s) in solid or solution form, e.g., part of a masterbatch solution or otherwise.

Examples of suitable opacifying agents, pigments or colorants are iron oxide, carbon black, aluminum, titanium dioxide ($TiO_2$), calcium carbonate ($CaCO_3$), and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 μm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is erucamide.

Non-migratory slip agents, used in one or more skin layers of the multilayered films, may comprise, consist essentially of, or consist of polymethyl methacrylate (PMMA). The non-migratory slip agent may have a mean particle size in the range of from about 0.5 μm to 8 μm, or 1 μm to 5 μm, or 2 μm to 4 μm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may comprise, consist essentially of, or consist of phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may comprise, consist essentially of, or consist of alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may comprise, consist essentially of, or consist of silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 5000 ppm of the weight of the layer(s) to which it is added. In other embodiments, the antiblocking agent may comprise, consists essentially of or consists of the antiblocking agent dispersed in a polypropylene-based masterbatch, such as Ampacet 401960.

Useful fillers may comprise, consist essentially of, or consist of finely divided inorganic solid materials such as silica, fumed silica, diatomaceous earth, calcium carbonate, calcium silicate, aluminum silicate, kaolin, talc, bentonite, clay and pulp.

Metallization

The outer surface (i.e., side facing away from the core) of any skin layer may undergo metallization after optionally being treated. Metallization may be carried out through plasma- or vacuum-deposition or otherwise of a metal layer such as aluminum, copper, silver, chromium, or mixtures thereof. Before metallization, a coating may be applied to an outer skin layer "outside" or "inside" the vacuum chamber to result in the following, example structure: metallized layer/coating layer (optionally primed)/skin layer/tie layer/core/tie layer/skin layer. In further example embodiments, a primer may be applied on a metal surface followed by one or more top coatings.

In certain embodiments, the metal for metallization is metal oxide, any other inorganic materials, or organically modified inorganic materials, which are capable of being vacuum- or plasma-deposited, electroplated or sputtered, such as, for example, SiOx, AlOx, SnOx, ZnOx, IrOx, wherein x=1 or 2, organically modified ceramics "ormocer", etc. The thickness of the deposited layer(s) is typically in the range from 100 to 10,000 Angstrom or preferably from 300 to 1000 Angstrom.

Surface Treatment

One or both of the outer surfaces of the multilayered films—that is, on one or both skins—may be surface-treated to increase the surface energy to render the film receptive to metallization, coatings, printing inks, adhesives, and/or lamination. The surface treatment can be carried out according to one of the methods known in the art including corona discharge, flame, plasma, chemical treatment, or treatment by means of a polarized flame.

Priming

A primer coating may be applied to multilayered films. In example embodiments, a skin of the multilayer film, i.e., substrate, may be treated, such as by one of the foregoing methods, to provide increased active adhesive sites thereon and to the thus-treated film surface there may be subsequently applied a continuous coating of a primer material. Such primer materials are well known in the art and include, for example, epoxy, poly(ethylene imine) (PEI), and polyurethane materials. U.S. Pat. Nos. 3,753,769, 4,058,645 and 4,439,493, each incorporated herein by reference, discloses the use and application of such primers. The primer provides an overall adhesively active surface for thorough and secure bonding with the subsequently applied coating composition and can be applied to the film by conventional solution coating means, for example, by roller application.

Coating

An optionally primed skin layer of the substrate, e.g., the skin/tie layer/core/tie layer/skin films described herein, may be coated with EVOH polymers, which, as previously noted, EVOH is understood to include EVOH polymers only, EVOH and PVOH polymers, or PVOH polymers only. Coating may be achieved by any known technique. In one example embodiment, the EVOH coating comprises, consists essentially of, or consists of Evalca HR 3010.

Orienting

The films herein are also characterized in certain embodiments as being biaxially oriented. The films can be made by any suitable technique known in the art, such as a tentered or blown process, LISIM™, and others. Further, the working conditions, temperature settings, lines speeds, etc. will vary depending on the type and the size of the equipment used. Nonetheless, described generally here is one method of making the films described throughout this specification. In a particular embodiment, the films are formed and biaxially oriented using the tentered method. In the tentered process, line speeds of greater than 100 m/min to 400 m/min or more, and outputs of greater than 2000 kg/h to 4000 kg/h or more are achievable. In the tenter process, sheets/films of the various materials are melt-blended and coextruded, such as through a 3, 4, 5, 7-layer die head, into the desired film structure. Extruders ranging in diameters from 100 mm to 300 or 400 mm, and length to diameter ratios ranging from 10/1 to 50/1 can be used to melt blend the molten layer materials, the melt streams then metered to the die having a die gap(s) within the range of from 0.5 or 1 to an upper limit of 3 or 4 or 5 or 6 mm. The extruded film is then cooled using air, water, or both. Typically, a single, large diameter roll partially submerged in a water bath, or two large chill rolls set at 20 or 30 to 40 or 50 or 60 or 70° C. are suitable cooling means. As the film is extruded, an air knife and edge pinning are used to provide intimate contact between the melt and chill roll.

Downstream of the first cooling step in this embodiment of the tentered process, the unoriented film is reheated to a temperature of from 80 to 100 or 120 or 150° C., in one embodiment by any suitable means such as heated S-wrap rolls, and then passed between closely spaced differential speed rolls to achieve machine direction orientation. It is understood by those skilled in the art that this temperature range can vary depending upon the equipment, and in particular, upon the identity and composition of the components making up the film. Ideally, the temperature will be below that which will melt the film, but high enough to facilitate the machine direction orientation process. Such temperatures referred to herein refer to the film temperature itself. The film temperature can be measured by using, for example, infrared spectroscopy, the source aimed at the film as it is being processed; those skilled in the art will understand that for transparent films, measuring the actual film temperature will not be as precise. The heating means for the film line may be set at any appropriate level of heating, depending upon the instrument, to achieve the stated film temperatures.

The lengthened and thinned film is passed to the tenter section of the line for TD orientation. At this point, the edges of the sheet are grasped by mechanical clips on continuous chains and pulled into a long, precisely controlled hot air oven for a pre-heating step. The film temperatures range from 100 or 110 to 150 or 170 or 180° C. in the pre-heating step. Again, the temperature will be below that which will melt the film, but high enough to facilitate the step of transverse direction orientation. Next, the edges of the sheet are grasped by mechanical clips on continuous chains and pulled into a long, precisely controlled hot air oven for transverse stretching. As the tenter chains diverge a desired amount to stretch the film in the transverse direction, the process temperature is lowered by at least 2° C. but typically no more than 20° C. relative to the pre-heat temperature to maintain the film temperature so that it will not melt the film. After stretching to achieve transverse orientation in the film, the film is annealed at a temperature below the melting point, and the film is then cooled from 5 to 10 or 15 or 20 or 30 or 40° C. below the stretching temperature, and the clips are released prior to edge trim, optional coronal, printing and/or other treatment can then take place, followed by winding.

Thus, TD orientation is achieved by the steps of pre-heating the film having been machine oriented, followed by stretching and annealing it at a temperature below the melt point of the film, and then followed by a cooling step at yet a lower temperature. In one embodiment, the films described herein are formed by imparting a transverse orientation by a process of first pre-heating the film, followed by a decrease in the temperature of the process within the range of from 2 or 3 to 5 to 10 or 15 or 20° C. relative to the pre-heating temperature while performing transverse orientation of the film, followed by a lowering of the temperature within the range of from 5° C. to 10 or 15 or 20 or 30 or 40° C. relative to the melt point temperature, holding or slightly decreasing (more than 5%) the amount of stretch, to allow the film to anneal. The latter step imparts the low TD shrink characteristics of the films described herein. Thus, for example, where the pre-heat temperature is 120° C., the stretch temperature may be 114° C., and the cooling step may be 98° C., or any temperature within the ranges disclosed. The steps are carried out for a sufficient time to affect the desired film properties as those skilled in the art will understand.

Thus, in certain embodiments the film(s) described herein are biaxially oriented with at least a 5 or 6 or 7 or 11-fold TD orientation and at least a 2 or 3 or 7-fold MD orientation. Being so formed, the at least three-layer (one core, two skin layers, 18-21 μm thickness) possess an ultimate tensile strength within the range of from 100 or 110 to 80 or 90 or 250 MPa in the TD in certain embodiments; and possess an ultimate tensile strength within the range of from 30 or 40 to 150 or 130 MPa in the MD in other embodiments.

INDUSTRIAL APPLICABILITY

The disclosed multilayered films may be stand-alone films, laminates, or webs. Or, the multilayered films may be sealed, coated, metallized, and/or laminated to other film structures. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications, it may be desirable to laminate the multilayered films to other polymeric film or paper products for purposes such as package decor including printing and metallizing. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

Example Embodiments

Below is an example film in line with the foregoing disclosure, wherein the example may be modified in line with the foregoing disclosure in other example embodiments:

Substrate

| | | | corona-treated |
|---|---|---|---|
| L1 | skin | 1.3 μm | 92 wt. % EP copolymer or terpolymer + 8 wt. % antiblock masterbatch in EP or EPB |
| L2 | tie | 2.5 μm | 57.5 wt. % HDPE + 20 wt. % mLLDPE + 20 wt. % olefin block copolymer ("OBC") + 2.5 wt. % polyethylene stabilizer masterbatch |
| L3 | core | 15 μm | 87 wt. % HDPE + 10 wt. % mLLDPE + 3 wt. % polyethylene stabilizer masterbatch |
| L4 | tie | 2.5 μm | 57.5 wt. % HDPE + 20 wt. % mLLDPE + 20 wt. % OBC + 2.5 wt. % polyethylene stabilizer masterbatch |
| L5 | skin | 1.3 μm | 100% EP copolymer |

Coating (in-Line or Out-of-Line)

TABLE 1

| | | | optionally treated during orienting and/or during the in-line or out-of-line coating process |
|---|---|---|---|
| L6 | primer | | standard primer, e.g., polyethyleneimine |
| L7 | aqueous EVOH layer | 0.3 g/100 in$^2$ | aqueous EVOH |
| L8 | metal-oxide layer | 10 nm | vacuum deposition of AlO$_x$ or other metal oxide |

Barrier Data for Table 1's Example Embodiment of a Coated Substrate

TABLE 2

| WVTR at 100° F. and 90% relative humidity (ASTM F1249 standard) | 0.040 g/100 in$^2$/d 0.618 g/m$^2$/d |
|---|---|
| OTR at 73° F. and 0% relative humidity (ASTM D3895 standard) | 0.009 cm$^3$/100 in$^2$/d 0.133 cm$^3$/m$^2$/d |

The substrate portion, itself, may be coextruded together in any form, e.g., serially, two coextruded layers combined with the other three coextruded layers, or any other combination before being coated and metallized. In various example embodiments, the thickness of the layers may be as follows: L1, L5=0.5 to 4 µm; L2, L4=0.5 to 4 µm; L3=7 to 60 µm; L6=a dry coating weight of from about 0.5 up through about 2.5 g/m$^2$; L7=0.2 to 0.6 g/100 in$^2$; and L8=7 to 15 nm.

Although Tables 1 and 2 provide a specific embodiment, other example embodiments have layers that have ranges of components comprising, consisting essentially of, or consisting of:

L1, L5=>90 wt. % EP copolymer and optionally 0 wt. % through about 5 wt. % additives, such as antiblock in EP or EPB masterbatch;

L2 and L4, in other example embodiments, these tie layers may be the same or different. For example, each tie layer's components may comprise, consists essentially of, or consists of the adhesion promoter, e.g., olefin block copolymer ("OBC"), may be from 15 wt. % through 50 wt. %, or any of the countless ranges therebetween, in one or both of these tie layers, with the balance being mLLDPE, HDPE and optionally additives, i.e., 0 wt. % through about 5 wt. % of additives. Similarly, in other example embodiments, each tie layer's components may comprise, consists essentially of, or consists of mLLDPE may be from 5 wt. % through 60 wt. %, or any of the countless ranges therebetween, in one or both of these tie layers, with the balance being OBC, HDPE and optionally additives;

L3, in other example embodiments, the core's components may comprise, consists essentially of, or consists of from 0 wt. % through 20 wt. % HCR, from 5 wt. % to 25 wt. % mLLDPE, and the balance being HDPE optionally with about 5% or less additives. Again, the ranges expressed for each of component may be any of the countless ranges therebetween;

L6=primers that may be used include, for instance, those disclosed and used, for instance, in U.S. Pat. Nos. 3,753,769, 4,058,645 and 4,439,493, each of which are incorporated herein by this reference.

The foregoing ranges expressed for each component in the layers may be any of the countless ranges therebetween. Furthermore, although the substrate shows mLLDPE in L2-L4, other example embodiments could substitute mLLDPE with LDPE, other catalyzed forms of LLDPE, or combinations thereof.

Below are further example embodiments of the disclosed film that are written in claim form:

1. A multilayer film comprising:
    a core layer comprising a polyethylene stabilizer optionally in a masterbatch solution and at least 50 wt. % of high-density polyethylene;
    a first skin layer comprising at least 90 wt. % ethylene-propylene polymer and antiblock;
    a second skin layer consisting of an ethylene-propylene copolymer or terpolymer,
    a primer layer on the second skin;
    an aqueous barrier layer of ethylene vinyl alcohol polymer, polyvinyl alcohol polymer, or combinations thereof on the primer layer; and
    a metallization layer on the aqueous barrier layer,
    wherein the multilayer film is oriented in at least one direction.
2. The multilayer film of claim 1, further comprising one or more additives.
3. The multilayer film of claim 1, further comprising one or more tie layers.
4. The multilayer film of claim 3, wherein the one or more tie layers comprise high-density polyethylene.
5. The multilayer film of claim 3, wherein the one or more tie layers comprise at least 50 wt. % high-density polyethylene.
6. The multilayer film of claim 3, wherein the one or more tie layers comprise at least one olefin block copolymer.
7. The multilayer film of claim 3, wherein the one or more tie layers comprise at least one low-density polyethylene.
8. The multilayer film of claim 3, wherein the one or more tie layers comprise a polyethylene stabilizer optionally in a masterbatch solution that is identical or different from the polyethylene stabilizer optionally in the masterbatch solution in the core layer.
9. The multilayer film of claim 3, wherein the one or more tie layers comprise a polyethylene stabilizer that is identical or different from the polyethylene stabilizer in the core layer.
10. The multilayer film of claim 3, wherein the one or more tie layers comprise high-density polyethylene, at least one olefin-block copolymer, and low-density polyethylene.
11. The multilayer film of claim 9, further comprising a polyethylene stabilizer optionally in a masterbatch solution that is identical or different from the polyethylene stabilizer optionally in the masterbatch solution in the core layer.
12. The multilayer film of claim 3, wherein the one or more tie layers comprise from 15 wt. % through 50 wt. % of one or more olefin block copolymers with a balance consisting of low-density polyethylene, high-density polyethylene, additives and combinations thereof.
13. The multilayer film of claim 3, wherein the one or more tie layers comprise from 5 wt. % through 50 wt. % of low-density polyethylene with a balance consisting of one or more olefin block copolymers, high-density polyethylene, additives and combinations thereof.
14. The multilayer film of claim 1, wherein the core layer further comprising hydrocarbon resin.
15. The multilayer film of claim 1, wherein the core layer further comprising low-density polyethylene.
16. The multilayer film of claim 1, wherein the core layer consists of from 0 wt. % through 20 wt. % hydrocarbon resin, from 5 wt. % through 25 wt. % of low-density polyethylene, high-density polyethylene, 0 wt. % through about 5 wt. % of additives, and combinations thereof.
17. The multilayer film of claim 1, wherein the primer layer comprises polyethyleneimine.
18. The multilayer film of claim 1, wherein at least the core layer, first skin layer, and second skin layer are coextruded.
19. The multilayer film of claim 1, wherein the first skin layer and/or the second skin layer are treated on side(s) opposing the core layer.
20. The multilayer film of claim 1, wherein the primer layer and/or the aqueous barrier layer are applied through in-line or out-of-line coating.
21. The multilayer film of claim 1, wherein low-density polyethylene present in any layer of the multilayer film comprises metallocene-catalyzed, linear, low-density polyethylene.

While the foregoing is directed to example embodiments of the disclosed invention, other and further embodiments may be devised without departing from the basic scope thereof, wherein the scope of the disclosed compositions, systems and methods are determined by one or more claims.

What is claimed is:

1. A multilayer film comprising:
   a core layer comprising a polyethylene stabilizer optionally in a masterbatch solution and at least 50 wt. % of high-density polyethylene;
   a first skin layer comprising at least 90 wt. % ethylene-propylene polymer and antiblock;
   a second skin layer consisting of an ethylene-propylene copolymer or terpolymer,
   a primer layer on the second skin;
   an aqueous barrier layer of ethylene vinyl alcohol polymer, polyvinyl alcohol polymer, or combinations thereof on the primer layer; and
   a metallization layer on the aqueous barrier layer,
   wherein the multilayer film is oriented in at least one direction.

2. The multilayer film of claim 1, further comprising one or more additives.

3. The multilayer film of claim 1, wherein the core layer further comprising hydrocarbon resin.

4. The multilayer film of claim 1, wherein the core layer further comprising low-density polyethylene.

5. The multilayer film of claim 1, wherein the core layer consists of from 0 wt. % through 20 wt. % hydrocarbon resin, from 5 wt. % through 25 wt. % of low-density polyethylene, high-density polyethylene, 0 wt. % through about 5 wt. % of additives, and combinations thereof.

6. The multilayer film of claim 1, wherein the primer layer comprises polyethyleneimine.

7. The multilayer film of claim 1, wherein at least the core layer, first skin layer, and second skin layer are coextruded.

8. The multilayer film of claim 1, wherein the first skin layer and/or the second skin layer are treated on side(s) opposing the core layer.

9. The multilayer film of claim 1, wherein the primer layer and/or the aqueous barrier layer are applied through in-line or out-of-line coating.

10. The multilayer film of claim 1, wherein low-density polyethylene present in any layer of the multilayer film comprises metallocene-catalyzed, linear, low-density polyethylene.

11. The multilayer film of claim 1, further comprising one or more tie layers.

12. The multilayer film of claim 11, wherein the one or more tie layers comprise high-density polyethylene.

13. The multilayer film of claim 11, wherein the one or more tie layers comprise at least 50 wt. % high-density polyethylene.

14. The multilayer film of claim 11, wherein the one or more tie layers comprise at least one olefin block copolymer.

15. The multilayer film of claim 11, wherein the one or more tie layers comprise at least one low-density polyethylene.

16. The multilayer film of claim 11, wherein the one or more tie layers comprise a polyethylene stabilizer optionally in a masterbatch solution that is identical or different from the polyethylene stabilizer optionally in the masterbatch solution in the core layer.

17. The multilayer film of claim 11, wherein the one or more tie layers comprise high-density polyethylene, at least one olefin-block copolymer, and low-density polyethylene.

18. The multilayer film of claim 11, wherein the one or more tie layers comprise from 15 wt. % through 50 wt. % of one or more olefin block copolymers with a balance consisting of low-density polyethylene, high-density polyethylene, additives and combinations thereof.

19. The multilayer film of claim 11, wherein the one or more tie layers comprise from 5 wt. % through 50 wt. % of low-density polyethylene with a balance consisting of one or more olefin block copolymers, high-density polyethylene, additives and combinations thereof.

20. The multilayer film of claim 11, wherein the one or more tie layers comprise a polyethylene stabilizer that is identical or different from the polyethylene stabilizer in the core layer.

21. The multilayer film of claim 20, further comprising a polyethylene stabilizer optionally in a masterbatch solution that is identical or different from the polyethylene stabilizer optionally in the masterbatch solution in the core layer.

* * * * *